United States Patent
Tsuda (10) Patent No.: US 9,520,064 B2
(45) Date of Patent: Dec. 13, 2016

(54) TRAIN-OF-VEHICLE TRAVEL SUPPORT DEVICE, CONTROL SYSTEM AND PROCESSOR UNIT

(75) Inventor: Yoshiaki Tsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 13/003,049

(22) PCT Filed: Jun. 30, 2009

(86) PCT No.: PCT/JP2009/061939
§ 371 (c)(1),
(2), (4) Date: Jan. 7, 2011

(87) PCT Pub. No.: WO2010/004911
PCT Pub. Date: Jan. 14, 2010

(65) Prior Publication Data
US 2011/0118967 A1    May 19, 2011

(30) Foreign Application Priority Data

Jul. 10, 2008   (JP) .................................. 2008-180349

(51) Int. Cl.
*G01F 19/00*       (2006.01)
*G08G 1/16*        (2006.01)
(Continued)

(52) U.S. Cl.
CPC .............. *G08G 1/161* (2013.01); *B60W 30/10* (2013.01); *B60W 30/16* (2013.01);
(Continued)

(58) Field of Classification Search
CPC .. B60W 30/10; B60W 30/16; B60W 2420/42; B60W 2420/62; B60W 2520/10; B60W 2550/402; G08G 1/161
(Continued)

(56) References Cited

U.S. PATENT DOCUMENTS 5,680,122 A    10/1997  Mio
5,781,119 A    7/1998   Yamashita et al.
(Continued)

FOREIGN PATENT DOCUMENTS

JP    8 314541    11/1996
JP    9 81899     3/1997
(Continued)

OTHER PUBLICATIONS

Extended European Search Report issued Nov. 16, 2012, in European Patent Application No. 12184432.8.
(Continued)

*Primary Examiner* — Marthe Marc-Coleman
(74) *Attorney, Agent, or Firm* — Oblon, McClelland, Maier & Neustadt, L.L.P.

(57) ABSTRACT

A train-of-vehicle travel support device which enables a train-of-vehicle travel of a plurality of vehicles even on a running road in which no magnetic marker is embedded. The train-of-vehicle travel support device includes a sensor unit obtaining road line shape data of a feature on a road surface, a processor unit obtaining running control data based on comparison of the road line shape data obtained by the sensor unit and reference data which has been previously stored, and an inter-vehicle communication device transmitting wirelessly the running control data obtained by the processor unit to a following vehicle.

8 Claims, 6 Drawing Sheets

(51) Int. Cl.
  *B60W 30/10* (2006.01)
  *B60W 30/16* (2012.01)
(52) U.S. Cl.
  CPC ..... *B60W 2420/42* (2013.01); *B60W 2420/62* (2013.01); *B60W 2520/10* (2013.01); *B60W 2550/402* (2013.01)
(58) Field of Classification Search
  USPC .............................. 701/23, 26, 117, 300, 301
  See application file for complete search history.

(56) References Cited

U.S. PATENT DOCUMENTS

| | | | |
|---|---|---|---|
| 5,815,825 | A | 9/1998 | Tachibana et al. |
| 5,913,376 | A | 6/1999 | Takei |
| 2002/0134151 | A1* | 9/2002 | Naruoka ................. G01S 11/12 73/291 |
| 2002/0198632 | A1 | 12/2002 | Breed et al. |
| 2004/0080449 | A1* | 4/2004 | Horibe ................. G01S 7/4026 342/70 |
| 2004/0096082 | A1* | 5/2004 | Nakai ................. G06K 9/00651 382/104 |
| 2005/0231339 | A1* | 10/2005 | Kudo ........................ B60R 1/00 340/435 |
| 2006/0111831 | A1* | 5/2006 | Sekiguchi ............. B60W 30/16 701/96 |
| 2010/0004856 | A1 | 1/2010 | Kobori et al. |

FOREIGN PATENT DOCUMENTS

| | | |
|---|---|---|
| JP | 9 183383 | 7/1997 |
| JP | 9-183383 | 7/1997 |
| JP | 10 293899 | 11/1998 |
| JP | 2004 220341 | 8/2004 |
| JP | 2005-258696 | 9/2005 |
| JP | 2008-2906 | 1/2008 |
| JP | 2008 2906 | 1/2008 |
| WO | WO 2007/069726 A1 | 6/2007 |

OTHER PUBLICATIONS

International Search Report issued Jul. 28, 2009 in PCT/JP09/61939 filed Jun. 30, 2009.
European Communication Pursuant to Article 94(3) EPC issued on May 15, 2012, in patent Application No. 09 794 357.5.
Extended Search Report issued Sep. 16, 2011 in European Patent Application No. 09794357.5-2215/2306423.
Japanese Office Action issued Dec. 4, 2012, in Japan Patent Applicatlion No. 2010-519748 (with English translation).
Combined Chinese Office Action and Search Report Issued Jan. 28, 2013 in Patent Application No. 200980118335.0 (with partial English translation and English translation of Categories of Cited Documents).

* cited by examiner

TRAIN-OF-VEHICLE TRAVEL SUPPORT DEVICE, CONTROL SYSTEM AND PROCESSOR UNIT

TECHNICAL FIELD

The present invention relates to a train-of-vehicle travel support device which supports travel of a plurality of vehicles by forming a train of vehicles.

BACKGROUND ART

Conventionally, a train-of-vehicle travel support device has been known, in which a magnetic marker is embedded in the center of a running road of a vehicle, a magnetic sensor of vehicle detects the magnetism of the magnetic marker to specify road surface lateral displacement of the vehicle, and automatic steering of the vehicle is carried out along the magnetic marker, thereby controlling a train-of-vehicle travel of a plurality of vehicles. In the train-of-vehicle travel support device, by sending/receiving data such as a vehicle identifying number and the velocity, etc. through the radio communication or the optical communication between a preceding vehicle and a following vehicle, it is possible to carry out automatic velocity control of the following vehicle which follows the preceding vehicle and automatic braking control (for example, refer to Patent Literature 1).

CITATION LIST

Patent Literature

Patent Literature 1: JP09-81899A

SUMMARY OF INVENTION

Technical Problem

However, the conventional train-of-vehicle travel support device is based on the assumption that the road lateral displacement of vehicle is specified by the magnetic marker, there is a problem that the train-of-vehicle travel can be controlled only on the running road in which the magnetic marker is embedded. Further, there is another problem that it is impossible to specify precisely the position of the vehicle.

The present invention is provided to solve the above problems, and aims to obtain a train-of-vehicle travel support device which can carry out a train-of-vehicle travel of a plurality of vehicles even on the running road in which the magnetic marker is not embedded.

Solution to Problem

According to the present invention, a train-of-vehicle travel support device includes:

a preceding-vehicle-mounted sensor unit obtaining road line shape data including a three-dimensional position and data of a shape of a feature on a road surface;

a preceding-vehicle-mounted processor unit obtaining running control data of the preceding vehicle based on comparison of the road line shape data showing the three-dimensional position and the shape of the feature obtained by the preceding-vehicle-mounted sensor unit and reference data including a three dimensional position and data of a shape of the road surface which has been previously stored;

an inter-vehicle communication device transmitting the running control data of a preceding vehicle obtained by the preceding-vehicle-mounted processor unit to a following vehicle; and a following-vehicle-mounted processor unit obtaining running control data of the following vehicle based on the running control data of the preceding vehicle transmitted by the inter-vehicle communication device.

The preceding-vehicle-mounted processor unit corrects a self-position measured by navigation positioning based on difference information of the road line shape data with respect to the reference data, and obtains the running control data of the preceding vehicle based on the self-position corrected.

The train-of-vehicle travel support device includes:

a following-vehicle-mounted sensor unit mounted on the following vehicle and measuring position gap amount of a self-vehicle with respect to the preceding vehicle, and the following-vehicle-mounted processor unit obtains running control data of the self-vehicle based on the running control data of the preceding vehicle and the position gap amount measured by the following-vehicle-mounted sensor unit.

Advantageous Effects of Invention

According to the present invention, without the magnetic marker, it is possible to obtain an effect to grasp the correct position of the vehicles in the train-of-vehicle travel.

DESCRIPTION OF EMBODIMENTS

Embodiment 1

Figure 1:
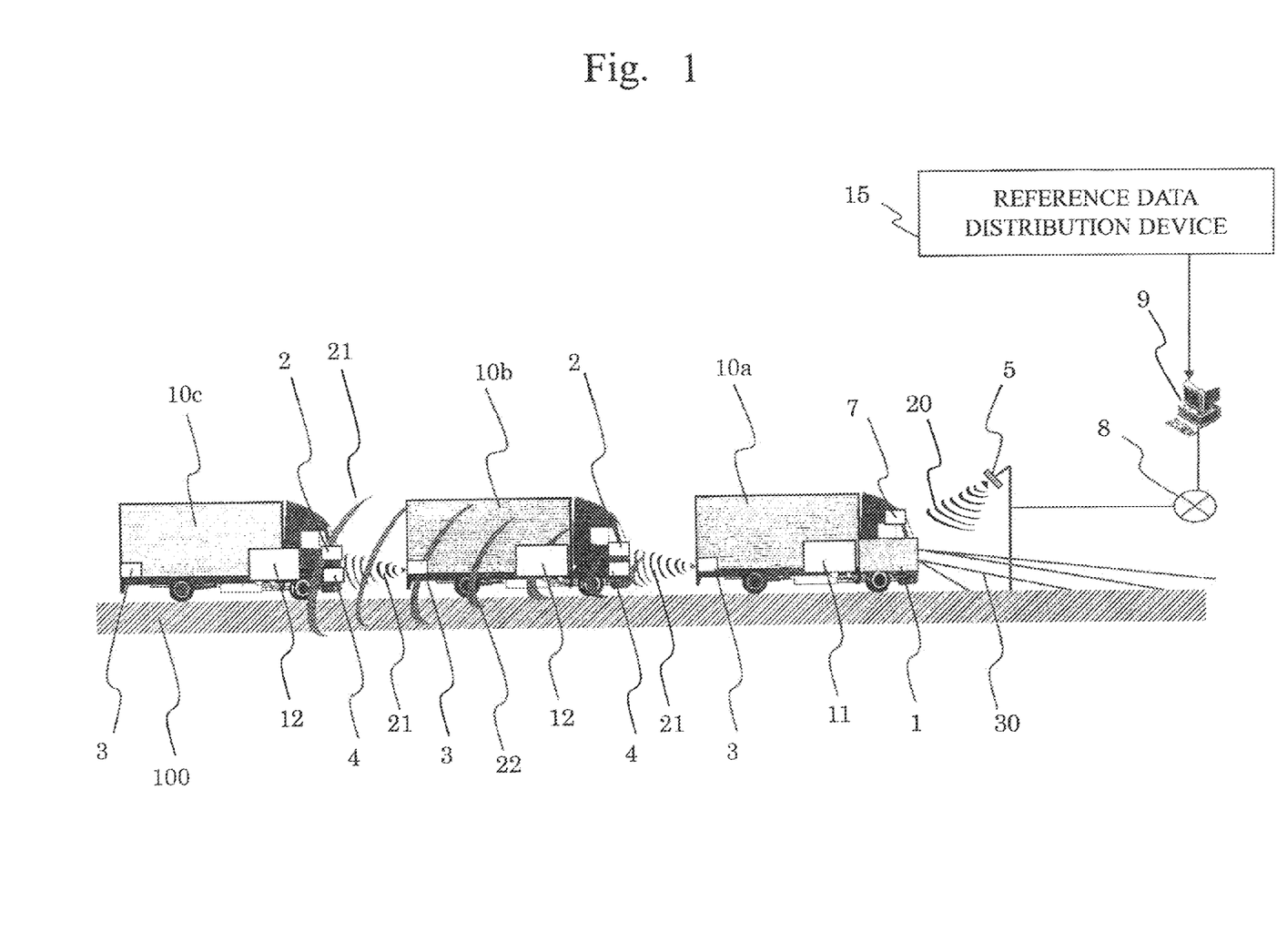
FIG. 1 is a diagram showing a configuration of a train-of-vehicle travel support device according to the first embodiment of the present invention.

FIG. 1 is a diagram showing a configuration of a train-of-vehicle travel support device according to the first embodiment of the present invention. FIG. 1 shows a status in which plural vehicles 10 form a train of vehicles and carry out automatic running on a road 100; after a lead vehicle 10a which runs the top of the train of vehicles, following vehicles 10b and 10c run sequentially in order. Here, the number of vehicles constituting the train of vehicles can be two or no less than four.

The lead vehicle 10a is mounted with a sensor unit 1, a road-vehicle communication device 7, an inter-vehicle communication device 3 for sending, and a processor unit 11. The following vehicle 10b is mounted with the inter-vehicle communication device 3 for sending, an inter-vehicle communication device 4 for receiving, a processor unit 12, and a sensor unit 2. The following vehicle 10c is mounted with the inter-vehicle communication device 3 for sending, the inter-vehicle communication device 4 for receiving, the processor unit 12, and the sensor unit 2. The road 100 is provided with an on-road communication device 5. The on-road communication device 5 is connected to a center server 9 through a network line 8. Further, the center server 9 is connected to a reference data distribution device 15 through a network line, not illustrated. In the reference data distribution device 15, reference data including a positioning information correction parameter, road line shape data, and road management information. The road line shape data of the reference data gives three-dimensional map data with a high precision. The center server 9 receives distribution of the reference data from the reference data distribution device 15. The center server 9 sends the reference data received from the reference data distribution device 15 and reference data correction information stored in its own database to the on-road communication device 5 through the network line 8.

Between the on-road communication device 5 and the in-vehicle communication device 7 of the lead vehicle 10a, road-vehicle communication 20 is carried out by sending/receiving data with radio communication or optical communication. In this case, in the on-road communication device 5, it is possible to perform the radio communication using a DSRC (Dedicated Short Range Communication) radio device which carries out dedicated narrowband communication encrypted by DSRC, and further, perform the radio communication using a UHF band radio device which carries out communication in an area having a wide communication range of UHF band. Further, by using an optical beacon for the on-road communication device 5, it is possible to perform communication by the optical communication, and possible to send correct position information of the on-road communication device 5. The on-road communication device 5 distributes the reference data from the reference data distribution device 15 to the in-vehicle communication device 7. The in-vehicle communication device 7 distributes the received reference data to the processor unit 11. The processor unit 11 updates the reference data stored in an internal memory device (53) based on the distributed information. The data updating cycle can be daily, weekly, or every time the processor unit 11 passes below the on-road communication device 5.

Here, instead of the on-road communication device 5, the reference data can be distributed using a satellite communication device mounted on a communication satellite between the in-vehicle communication device 7 of the lead vehicle 10a and the satellite communication device.

Between the inter-vehicle communication device 3 of the lead vehicle 10a and the inter-vehicle communication device 4 of the following vehicle 10b, inter-vehicle communication 21 is carried out by sending/receiving data with the radio communication or the optical communication. Similarly, between the inter-vehicle communication device 3 of the following vehicle 10b and the inter-vehicle communication device 4 of the following vehicle 10c, the inter-vehicle communication 21 is carried out by sending/receiving data with the radio communication or the optical communication. Further, also between the inter-vehicle communication device 3 of the lead vehicle 10a and the inter-vehicle communication device 4 of the following vehicle 10c, inter-vehicle communication 22 is carried out by sending/receiving data with the radio communication. For the radio communication in this case, communication in the area having a wide communication region using the UHF band is used. Between the inter-vehicle communication devices, vehicle control data is transmitted wirelessly by the inter-vehicle communication.

Here, in the example of FIG. 1, since there exists no vehicle with which a train of vehicles is formed after the following vehicle 10c, the inter-vehicle communication device 3 provided at the rear of the following vehicle 10c is not used. However, if there exists a following vehicle with which the train of vehicles is formed after the following vehicle 10c, the vehicle control data is transmitted wirelessly to the following vehicle by the inter-vehicle communication device 3.

Figure 2:
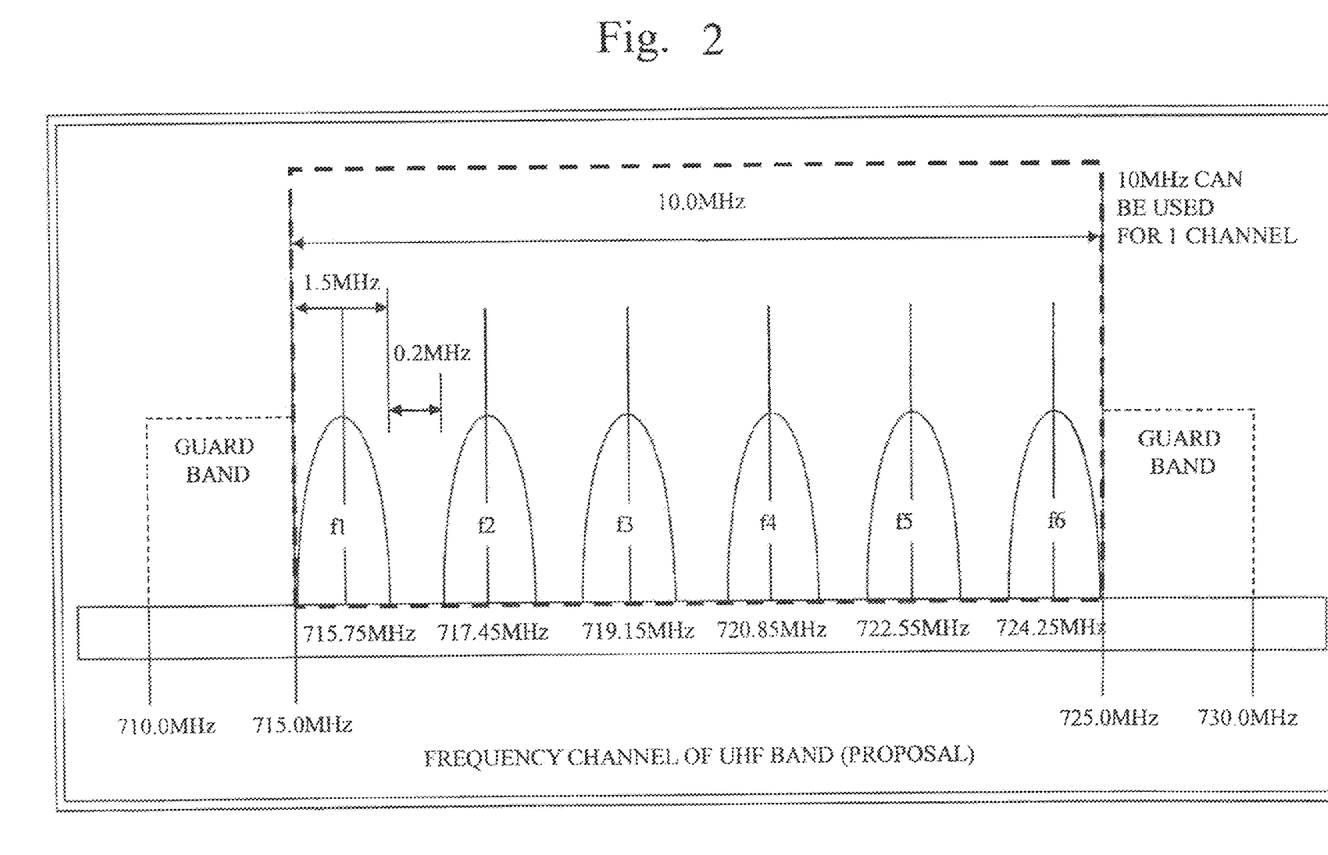
FIG. 2 is a diagram showing an example of frequency channels using the UHF band according to the first embodiment of the present invention.

FIG. 2 is a diagram showing an example of frequency channels using the UHF band. For example, the frequency in use in the UHF of 700 MHz is set from 715 MHz to 725 MHz (10 MHz band), and frequency division is done on the frequency band into six channels in order to use the frequencies effectively. By setting like the above, since two channels of uplink and downlink can be secured for the road-vehicle communication and four channels can be secured for the inter-vehicle communication, it is possible to simultaneously carry out the inter-vehicle communication with four channels for five vehicles.

The inter-vehicle communication device 3 and the inter-vehicle communication device 4 include a secure module for carrying out secure communication using a cipher, and in the inter-vehicle communication between the inter-vehicle communication device 3 and the inter-vehicle communication device 4, a communicating partner is authenticated by the secure module using a cipher key, and the cipher communication is done by encrypted data. The inter-vehicle communication device 4 reproduces the encrypted data transmitted from the inter-vehicle communication device 3 into plaintext by the secure module using the cipher key. Namely, since the data transmitted wirelessly between the inter-vehicle communication device 3 and the inter-vehicle communication device 4 is encrypted, it is possible to prevent falsification of data or receipt of erroneous data.

Figure 3:
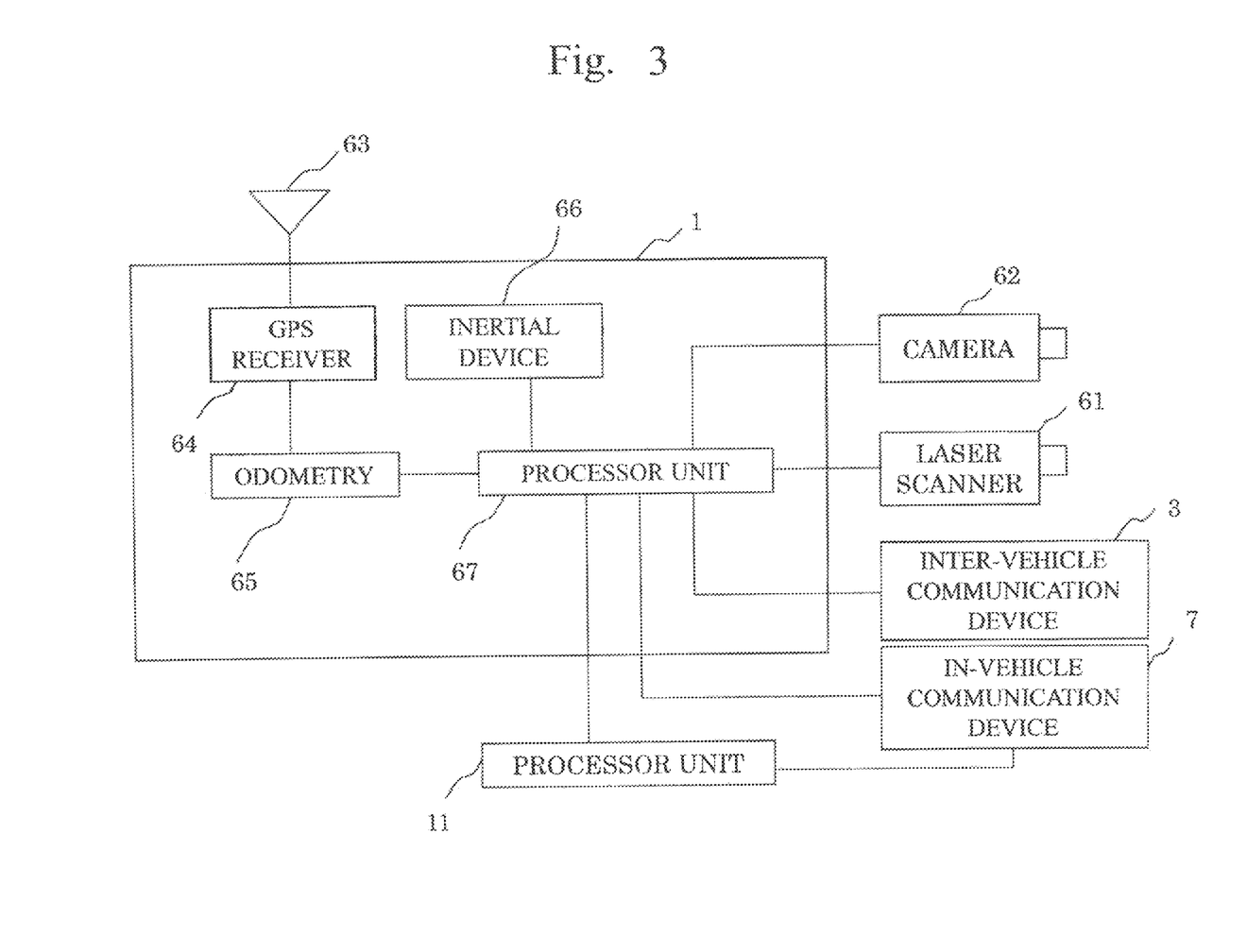
FIG. 3 is a diagram showing a configuration of a sensor unit 1 mounted on a lead vehicle according to the first embodiment of the present invention.

FIG. 3 is a diagram showing a configuration of the sensor unit 1 mounted on the lead vehicle 10a. In the figure, the sensor unit 1 includes a laser scanner 61, a camera 62, a GPS antenna 63, a GPS receiver 64, an odometry 65, an inertial device (Inertial Measurement Unit) 66, and a processor unit 67, thereby forming a mobile mapping system. The laser scanner 61, during the lead vehicle 10a is running, irradiates laser light towards the road surface of the road 100, as scanning two-dimensionally by directing the irradiation direction of the laser light to the tilt-pan direction with respect to the reference axis, receives reflected light from the road surface, measures the distance and the direction to the reflecting point, and thereby the point cloud data of the distance image related to the road surface, the feature on the road surface, the feature around the road surface, etc. within a range of some meters to 10 several meters ahead of the lead vehicle 10a are obtained from the laser scanner 61. Here, the point cloud data of the distance image is discretized data including information of a vertical angle (tilt) and an azimuth angle (pan) with respect to the reference axis of the laser scanner 61 and the distance information from the laser scanner 61 to the laser light reflected point (measurement point). The camera 62 takes two-dimensional images of the road surface of the road 100 during the lead vehicle 10a is running. Here, instead of the laser scanner 61, by a stereo image processing using a stereo camera, the distance image to the road surface, the feature on the road surface and the feature around the road surface can be obtained from the stereo camera.

The GPS antenna 63 receives radio wave of two frequencies of L1 (1575.42 MHz) and L2 (1227.6 MHz) sent from a GPS satellite during the lead vehicle 10a is running. The GPS receiver 64 demodulates the radio wave of two frequencies received at the GPS antenna 63, analyzes a satellite navigation positioning signal, and calculates a pseudo distance from the GPS satellite to the lead vehicle 10a, the self-position, the position of the GPS satellite, etc. based on the analyzed result. At this time, using the positioning information correction parameter in the reference data distributed through the in-vehicle communication device 7, it is possible to calculate with a high precision the pseudo distance and the self-position. Here, the positioning information correction parameter is correction data to correct a delay error of the pseudo distance due to an ionosphere delay, an atmosphere delay, etc. in the received signal from the GPS satellite.

The odometry 65 outputs vehicle velocity pulses based on the rotation of wheels of the lead vehicle 10a, and measures the running distance and the running velocity of the lead vehicle 10a based on the vehicle velocity pulses. The inertial device 66 measures an acceleration, an angular velocity, etc. of the lead vehicle 10a by an acceleration sensor or a gyro. Further, the in-vehicle communication device 7 receives a positioning correction parameter included in the reference data by the communication with the on-road communication device 5, and transfers the received data to the processor unit 67.

The processor unit 67 carries out a complex positioning calculation process based on the positioning information by the satellite navigation positioning such as the pseudo distance, the position of the GPS satellite, the self-position, etc. measured by the GPS receiver 64, the odometry information obtained by the odometry 65 such as the running distance and running velocity, etc., the inertial information obtained by the inertial device 66 such as the acceleration, the angular velocity, etc., and locates the self-position in real time. In the complex positioning calculation process, an autonomous navigation positioning calculation is carried out by dead reckoning of the odometry information and the inertial information, GPS double phase difference is calculated by the satellite navigation positioning calculation by RTK (Real Time Kinematics), and the error correction of the navigation positioning calculation is carried out using an extended Kalman filter having the GPS double phase difference as an observed value.

The processor unit 67 carries out the three-dimensional position/shape measurement of the road surface position and shape of the road 100 and the position and shape of features around the road, etc. based on the point cloud data of the distance image to the road surface obtained by scanning with the laser scanner 61, the road surface image obtained by the camera 62, the self-position located by the positioning calculation, installation information such as the direction of line of sight, installation position, installation direction, etc. of the laser scanner 61 and the camera 62, and obtains the three-dimensional position/shape measurement data. For example, the position of the point cloud data of the distance image measured by the laser scanner scanning is corrected by the located self-position and the installation information, and thereby the three-dimensional position coordinate data of measurement point cloud which is measured dispersedly with an interval of 25 cm to 50 cm is obtained. This three-dimensional position coordinate data is expressed by the Earth fixed absolute position coordinate system with North Standard, and the International Terrestrial Reference Frame and the World Geodetic System, etc. is used as the coordinate system.

Further, the measuring times are matched between the camera 62 and the laser scanner 61, a line-of-sight vector connecting the position of the camera and the measurement point position of the laser scanner 61 at the same time is obtained, and thereby corresponding to each measurement point, the color information of the camera image in the direction of the line-of-sight vector corresponding to each measurement point can be obtained. From the three-dimensional position coordinate data obtained for each measurement point, the color information (RGB value) of the image of the camera 62. etc. corresponding to each measurement point, the three-dimensional position/shape measurement point cloud data is constituted. Here, the color information can be omitted from the three-dimensional position/shape measurement point cloud data.

Further, the processor unit 67 detects contours (edges) of landmarks such as road shoulder positions, white line positions, road surface signs of the road 100, traffic signs, etc. based on the road surface image obtained by the camera 62, and obtains three-dimensional position data corresponding to the detected contours of the landmarks by a linear interpolation process of data using the measured three-dimensional position/shape measurement point cloud data, thereby obtaining position/shape point cloud data of the landmarks.

At this time, the three-dimensional position data of the position of the center of gravity of the landmark or the point cloud which approximately expresses the landmark shape (for example, the white line of the road, a picture of the traffic sign, or an outline of the road sign mark, etc.) detected on the road surface or around the road can be used for the position/shape point cloud data of the landmarks.

The processor unit 67 sends the point cloud data including the three-dimensional position/shape measurement point cloud data and the position/shape point cloud data of the landmarks, which are obtained as discussed above to the processor unit 11 as the road line shape data together with the measurement time. At the same time, the self-position located by the positioning calculation is sent to the processor unit 11 together with the measurement time.

Here, if the direction of the center of scanning of the laser scanner 61 is misaligned from a symmetry line which passes the center of the front/rear of the vehicle, the misaligned amount in the direction of the center of scanning of the laser scanner 61 with respect to the center line of front/rear of the vehicle is obtained previously from the installation information, and can be added to the road line shape data as additional information.

The data generation process of the road line shape data which has been explained above is carried out in real time during the lead vehicle 10a is running.

Figure 4:
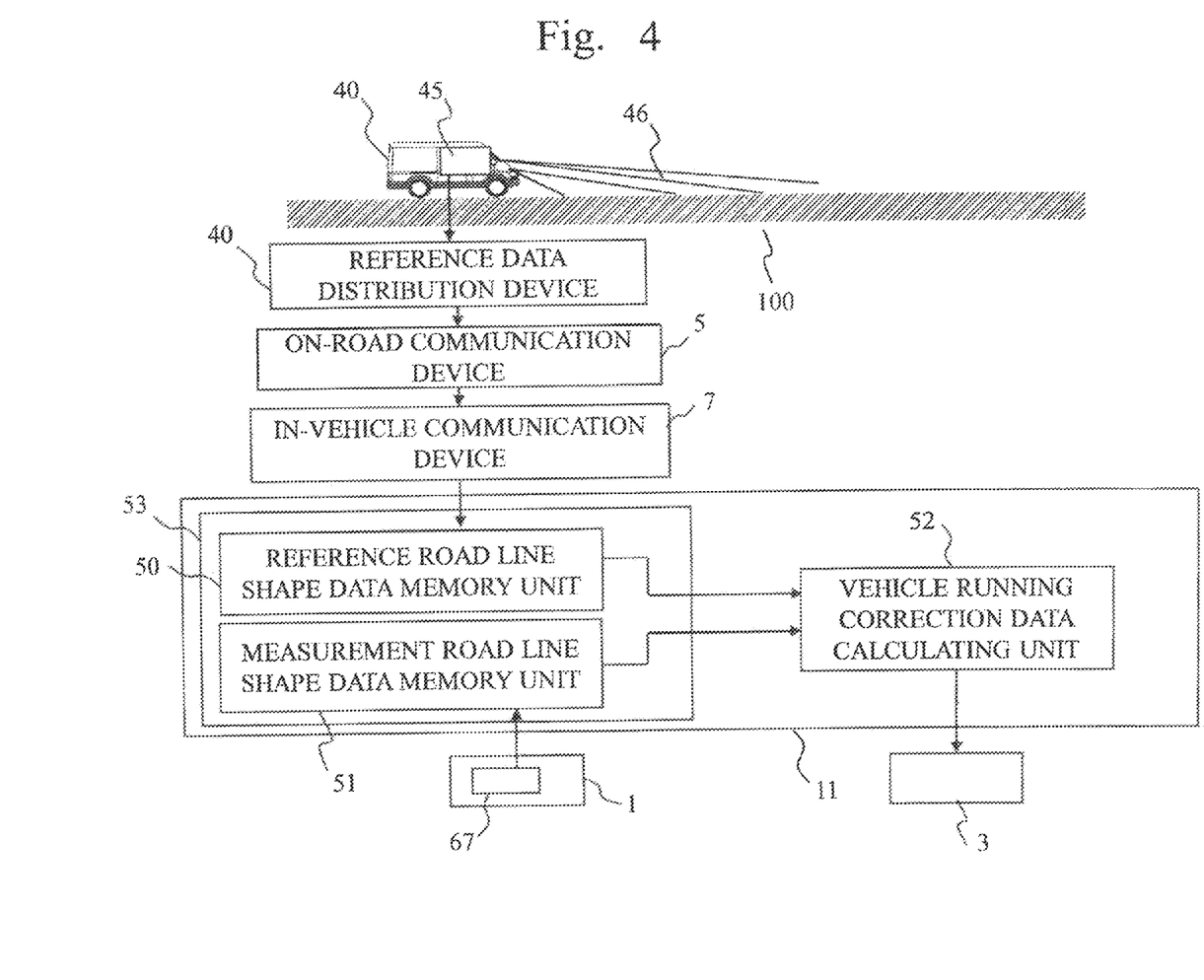
FIG. 4 is a block diagram showing a configuration of a processor unit mounted on the lead vehicle.

FIG. 4 is a block diagram showing a configuration of the processor unit 11 mounted on the lead vehicle 10a.

In the figure, the processor unit 11 includes a vehicle running correction data calculating unit 52 and a memory device 53. The memory device 53 includes a reference road line shape data memory unit 50 and a measurement road line shape data memory unit 51. The reference road line shape data memory unit 50 functions as a map data storage unit for storing the reference data. The reference data is sent from a reference data distribution device 40 to the on-road communication device 5 through the in-vehicle communication device 7, transferred from the on-road communication device 5 to the memory device 53, and stored in the memory device 53 previously.

To the measurement road line shape data memory unit 51, the road line shape data measured by the sensor unit 1 is sent from the processor unit 67, and the received road line shape data is temporality stored there. The measurement road line shape data memory unit 51 also functions as a data storage unit for automatic driving.

Here, when a DSRC beacon which carries out DSRC communication is used for the on-road communication device 5, and a DSRC in-vehicle device which carries out DSRC communication is used for the in-vehicle communication device 7, the data received by both of the DSRC communication is stored in the memory device 53 using an application management function of the DSRC in-vehicle device.

The memory device 53 can be an external memory device with respect to the processor unit 11.

The vehicle running correction data calculating unit 52 previously sets the own planned running route like an in-vehicle navigation system. The setting of the planned running route can be obtained, from the measured current self-position and the destination position, by calculation of the route connecting them for each lane of the road. At this time, the planned running route with higher position precision can be obtained based on the road line shape data. For the planned running route, the route is set for each lane so that the vehicle passes the virtual center line. For example, in a three-lane road, the planned running route is set for each lane. The planned running route is always changed to the optimal route according to the change of the current self-position so as to be with the shortest distance, with the shortest time, or with the minimum charge, or so that the vehicle passes the on-the-way passing point with the shortest distance.

The vehicle running correction data calculating unit 52 carries out a matching process for matching the road line shape data stored in the reference road line shape data memory unit 50 and the road line shape data stored in the measurement road line shape data memory unit 51.

In the matching process, corresponding points of the reference data and the road line shape data measured by the sensor unit 1 are searched, and a differential process is done by obtaining the difference of the searched corresponding points in the same three-dimensional position coordinate system. The vehicle running correction data calculating unit 52 obtains a position gap amount of the measured road line shape data for the reference data based on the differential process.

Next, the vehicle running correction data calculating unit 52 obtains the vehicle control data based on the position gap amount obtained by the matching process and the self-position located by positioning calculation of the sensor unit 1.

The vehicle running correction data calculating unit 52 outputs the obtained vehicle control data to the inter-vehicle communication device 3.

Figure 5:
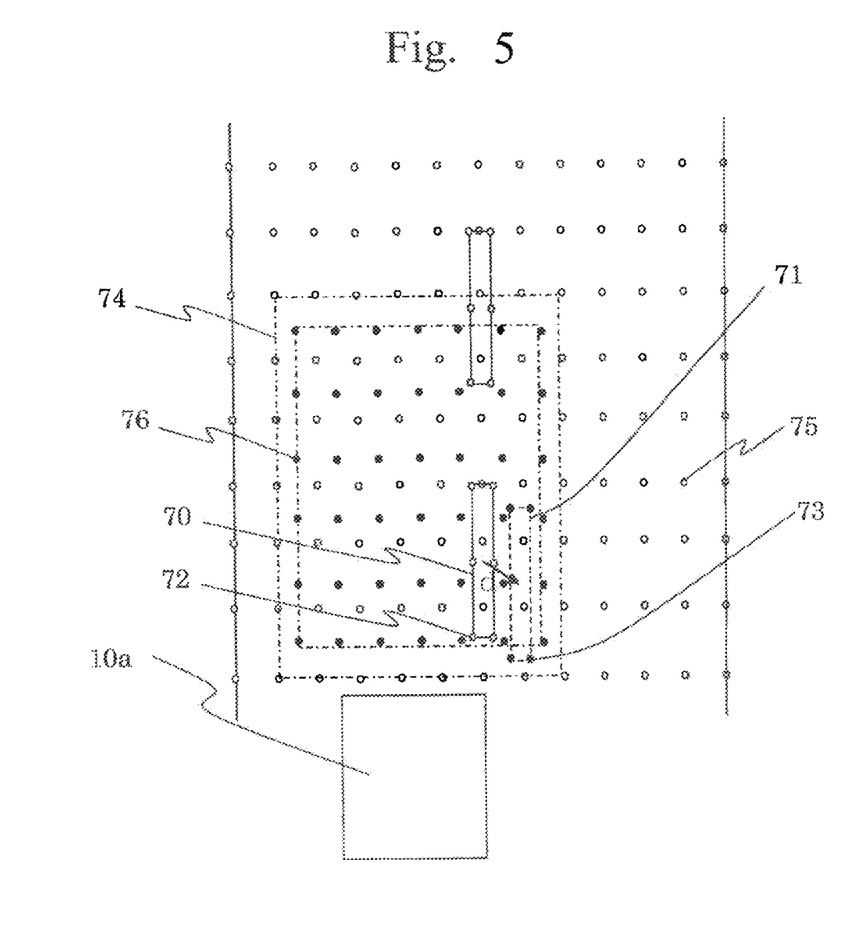
FIG. 5 is a diagram for explaining a matching process based on road line shape data by a vehicle running correction data calculating unit.

FIG. 5 is a diagram for explaining the matching process based on the road line shape data by the vehicle running correction data calculating unit 52.

In the figure, road line shape data 75 shows data point cloud which constitutes the reference data stored in the reference road line shape data memory unit 50. Road line shape data 76 shows data point cloud which constitutes the road line shape data measured by the sensor unit 1 and stored in the measurement road line shape data memory unit 51.

The vehicle running correction data calculating unit 52 carries out the matching process like the following. In the matching process, an example using the position/shape point cloud data of the white line (for example, a center line) which constitutes the road line shape data will be explained.

First, a corresponding point which corresponds to the road line shape data 76 is searched from the road line shape data 75.

In the corresponding point search, a predetermined range is selected from the point cloud constituting the road line shape data 75 based on the road line shape data 76, and the selected range is set as a matching area. Here, an example will be explained, in which a white line 70 is selected as the matching area; and it is assumed a shape model of the white line 70 approximately matches an existing white line.

Here, the matching area is set in the following manner. The coordinate of the position of the center of gravity of the point cloud data constituting the road line shape data 76 is obtained, a point which exists the nearest to the coordinate of the position of the center of gravity is selected from the point cloud data constituting the road line shape data 75, and from point cloud data in a predetermined area 74 including the selected point, white line point cloud data 72 constituting the white line 70 is extracted around the selected point. At this time, when there exist plural white lines in the predetermined area 74, white line point cloud data of the nearest white line should be selected. Further, when a white line forms a continuous center line, white line point cloud data should be selected for a part of the white line.

Next, out of the point cloud data constituting the road line shape data 76, white line point cloud data 73 constituting a white line shape model 71 is extracted from the point cloud which exists the nearest to the coordinate of the position of the center of gravity of the white line point cloud data 72. At this time, the white line shape model 71 is a white line shape, which is expressed by the point cloud, of the existing white line detected by the sensor unit 1. Because of measurement error of the sensor unit 1, the position and the shape of the white line shape model 71 are a little misaligned from the white line 70 of the reference data.

Next, the matching process of the road line shape data 75 and the road line shape data 76 will be explained.

In the matching process, for the white line point cloud data 72 of the white line 70 selected as the matching area, a position of the center of gravity G1 is obtained from the three-dimensional coordinate value of the point cloud. Further, for the white line point cloud data 73 of the white line shape model 71, a position of the center of gravity G2 is obtained from the three-dimensional coordinate value of the point cloud.

Subsequently, a difference between the position of the center of gravity G1 of the white line 70 and the position of the center of gravity G2 of the white line shape model 71 is taken, and a position gap amount d (an arrow in the figure) of the white line shape model 71 with respect to the white line 70 is obtained as a difference value. The position gap amount d is expressed by vector amount having information of direction and distance.

Here, although, in this example, the matching process using the white line on the road surface has been explained, another road sign can be used such as a velocity limitation sign, or a sign provided around the road can be also used.

Further, the three-dimensional position/shape measurement point cloud data which expresses the road surface can be directly used for carrying out the matching process. For example, from the three-dimensional position/shape measurement point cloud data in the reference data, the point cloud data which is adjacent to the three-dimensional position/shape measurement point cloud data measured by the sensor unit 1 is selected, the first approximate curved surface is obtained from the three-dimensional position/shape measurement point cloud data of the selected reference data, and as well the second approximate curved surface is obtained from the three-dimensional position/shape measurement point cloud data measured by the sensor unit 1. Then, by obtaining the gap between the first approximate curved surface and the second approximate curved surface as the difference value, the position gap amount d between the road line shape data 75 and the road line shape data 76 can be obtained.

Next, a process for computing the vehicle control data based on the matched result will be explained.

The vehicle running correction data calculating unit 52 obtains the vehicle control data based on the obtained position gap amount d and the self-position measured by the positioning calculation of the sensor unit 1. The vehicle control data is constituted by vehicle running correction data and steering control correction data.

At this time, the position gap amount d corresponds to the measurement error of the road line shape data measured by the sensor unit 1 with respect to the road line shape data of the reference data. The position gap amount d gives, with respect to the self-position measured by the sensor unit 1 at a certain measurement time, the vehicle running correction data at the same measurement time for correcting the positioning error.

Here, by providing the on-road communication device 5 with an optical beacon, correct position information of the on-road communication device 5 can be sent focusedly to within a specific small area of the road. The in-vehicle communication device 7, by receiving the position information from the optical beacon provided at the on-road communication device 5, obtains a correct self-position of the lead vehicle 10*a*. The vehicle running correction data calculating unit 52, by comparing the position information received from the optical beacon and the self-position measured by the sensor unit 1, can obtain the vehicle running correction data for correcting the self-position. By this operation, it is possible to obtain the current self-position correctly, and further to improve the precision of the vehicle running correction data. Here, the position information received from the optical beacon is stored in the memory device 53.

Further, the vehicle running correction data calculating unit 52, by correcting the self-position measured by the sensor unit 1 at a certain measurement time with the vehicle running correction data at the same measurement time, corrects the self-position. In addition, the vehicle running correction data calculating unit 52 obtains the position gap of the corrected self-position with respect to the planned running route, computes the steering control amount of the lead vehicle 10*a* so that the obtained position gap should become 0, and the computed steering control amount is set as steering control correction data of the vehicle control data.

Here, when the road has plural lanes, if the vehicle keeps running on the same lane, the steering control amount is computed for the planned running route in that running lane so that the position gap of the self-position should be 0.

Further, in case of changing the lane to the neighboring lane, the steering control amount is computed for the planned running route in the changed lane so that the position gap of the self-position should become 0.

Here, the vehicle running correction data calculating unit 52 may obtain the distance between the corrected self-position and the road center line included in the road line shape data of the reference data, and compute the steering control amount of the lead vehicle 10*a* so that the distance in the road width direction with respect to the road center line should be within a predetermined distance range, to set the computed steering control amount as the steering control correction data of the vehicle control data.

By this operation, regardless of the planned running route, the lead vehicle 10*a* can run autonomously with constantly keeping a fixed distance with respect to the center line.

At this time, in case of changing the lane on the road having plural lanes, the distance between the corrected self-position and the road center line neighboring to the changed lane is obtained, and the steering control amount of the lead vehicle 10*a* should be computed so that the distance in the road width direction with respect to the road center line should be within the predetermined distance range.

The processor unit 11 of the lead vehicle 10*a* carries out the steering control of the steering of the self-vehicle based on the steering control correction data of the vehicle control data. By this operation, the lead vehicle 10*a* can run autonomously along the planned running route or the center line.

Further, the processor unit 11 regulates the accelerator opening degree of the lead vehicle 10*a* based on the steering control amount, and regulates the velocity based on the prescribed velocity regulation program so that the running velocity should be within the predetermined range. At this time, the velocity should be regulated so that when the steering control amount is large, the running velocity is made to be the minimum, and when the steering control amount is 0, the running velocity is made to be the maximum.

As a matter of course, when another vehicle which does not belong to the same train of vehicles or an obstacle appears ahead of the lead vehicle 10*a*, the processor unit 11 adjusts the accelerator opening degree of the self-vehicle to decrease the running velocity, or computes the steering control amount for changing the lane to the neighboring lane, so that the lane change operation should be done so as to avoid the collision with the vehicle ahead or the obstacle, and thereby the steering is automatically operated and the running of the self-vehicle is automatically controlled.

At this time, as for the vehicle ahead or the obstacle, it is possible to detect its presence/absence and its existing position using the distance image of the laser scanner 61 or the shot image of the camera 62 in the sensor unit 1.

Here, in the lead vehicle 10*a*, an automatic driving mode and a manual driving mode can be switched by selecting a switch; in the manual driving mode, the steering operation or the accelerator pedal operation can be done manually.

Here, a method for obtaining the road line shape data which constitutes the reference data will be explained.

FIG. 4 illustrates a measurement example of the road line shape data by a mobile mapping system 45 mounted on a vehicle 40.

In the figure, the mobile mapping system 45 includes, as well as the sensor unit 1 explained in FIG. 3, a laser scanner, a camera, a GPS antenna, a GPS receiver, an odometry, an inertial device, and a processor unit. By these equipments, in the same manner as the sensor unit 1 of FIG. 3, while running on the road 100, it is possible to irradiate laser light 46, measure point cloud data including three-dimensional position/shape measurement point cloud data and position/shape point cloud data of landmarks, and obtain previously the measured result as the road line shape data. At this time, a GPS receiver with a high precision such as a position locating precision of cm to not more than 25 cm can be preferably used for the GPS receiver.

Here, in case of measuring the point cloud data of the distance image by the laser scanner scanning, it is possible to obtain the road line shape data with a higher precision (for example, with a position locating precision of 10 cm to not more than 25 cm) compared with the sensor unit 1 by measuring dispersedly at an interval of 10 cm to cm. To put it the other way around, a simple type system of which a measurement precision of the absolute position coordinate of point cloud data is lower compared with the mobile mapping system 45 (for example, a position locating precision of 25 cm to not more than 50 cm) can be used for the sensor unit 1.

The road line shape data collected previously by the mobile mapping system 45 is stored in the reference data distribution device 15 as the reference data every time the vehicle 40 carries out the measurement running of the road 100.

Next, the automatic running of the following vehicles 10*b* and 10*c* will be explained with reference to FIG. 1.

The inter-vehicle communication device 3 for sending, the inter-vehicle communication device 4 for receiving, and the sensor unit 2 are connected to the processor unit 12.

The following vehicles 10*b* and 10*c* respectively measure, using the sensor unit 2, a distance to a preceding vehicle, which runs just ahead (the lead vehicle 10*a* and the following vehicle 10*b*, respectively), and a position gap of the self-vehicle with respect to the preceding vehicle.

For example, the sensor unit 2 is constituted by the camera and an image processor; an image of a license plate of the rear part or the rear shape of the preceding vehicle is taken by the camera, and automatic follow-up of the license plate or the rear shape is carried out. The image processor of the sensor unit 2 measures a size of a field angle of the horizontal width direction (the horizontal direction) in the license plate image or the rear shape image taken by the camera. In the sensor unit 2, a size of a reference field angle of the horizontal width direction in the license plate or the rear shape shot with a predetermined distance L (for example, 20 m) from the camera is previously set and stored. The sensor unit 2 divides the reference field angle of the license plate or the rear shape which has been previously set by the field angle of the measured license plate image, and multiplies by the predetermined distance L, thereby measuring the distance to the preceding vehicle.

Further, by measuring the position of the center of gravity within the image of the license plate or the rear shape image taken by the camera of the sensor unit 2, it is possible to obtain the position gap amount of the preceding vehicle with respect to the center of line of sight of the sensor unit 2.

In this manner, the sensor unit 2 measures the distance to the preceding vehicle and the position gap amount of the self-vehicle with respect to the preceding vehicle.

Here, a stereo camera can be used for the camera of the sensor unit 2. In such a case, by taking the rear image of the preceding vehicle, the distance to the preceding vehicle and the position gap amount of the self-vehicle with respect to the preceding vehicle can be obtained by a stereo image processing.

Further, the distance to the preceding vehicle can be obtained using an in-vehicle millimeter-wave radar as the sensor unit 2.

In addition, by providing a self-position locating device at the sensor unit 2 and measuring the self-position precisely, the distance to the preceding vehicle and the position gap of the self-vehicle with respect to the preceding vehicle can be obtained precisely from a difference between a locating position of the preceding vehicle and a locating position of the self-vehicle. The self-position locating device is preferably constituted by a GPS antenna, a GPS receiver, an odometry, an inertial device, and a processor unit, so that the self-position is located by complex positioning.

The processor unit 12 mounted on the following vehicles 10*b* and 10*c* obtains a velocity target value and steering control correction data based on the steering control correction data of the vehicle control data obtained by the inter-vehicle communication, the distance to the preceding vehicle and the position gap of the self-vehicle with respect to the preceding vehicle measured by the sensor unit 2.

Then, control of the accelerator opening degree of the self-vehicle and steering control of the steering of the self-vehicle are done so that the distance to the preceding vehicle should be maintained within a fixed range, and at the same time, the position gap with respect to the preceding vehicle should be maintained within a fixed range.

At this time, by adding the position gap of the self-vehicle with respect to the preceding vehicle and the steering control correction data, the steering amount of the steering is obtained. By this operation, moving amount of the preceding vehicle can be predicted previously, so that even if the preceding vehicle changes the lane to the left/right, by steering the self-vehicle so as to follow the moving amount of the preceding vehicle, it is possible for the camera of the sensor unit 2 to catch-up and follow-up the rear part or the license plate of the preceding vehicle.

The following vehicle 10*b* sends the steering control correction data computed by the processor unit 12, the position gap data of the self-vehicle with respect to the preceding vehicle, and the vehicle running correction data received from the lead vehicle 10*a* to the following vehicle 10*c* which follows afterwards as the vehicle control data by the inter-vehicle communication.

The following vehicle 10*c* carries out the inter-vehicle communication with both of the lead vehicle 10*a* and the following vehicle 10*b*. By this operation, the vehicle control data is transmitted from both of the lead vehicle 10*a* and the following vehicle 10*b*.

At this time, when the vehicle control data sent from the lead vehicle 10*a* and the vehicle control data sent from the following vehicle 10*b* are different, the vehicle control data from the following vehicle 10*b* which runs directly ahead is used and the vehicle control data sent from the lead vehicle 10*a* is discarded.

In this way, since the following vehicle 10*c* can carry out the running control such as the lane change or the velocity change by following not the behavior of the lead vehicle 10*a* but the behavior of the following vehicle 10*b* which runs directly ahead, so that at the time of changing the lane, each vehicle can smoothly form the train of vehicles to connect to each other with maintaining a predetermined interval with the neighboring vehicle.

Figure 6:
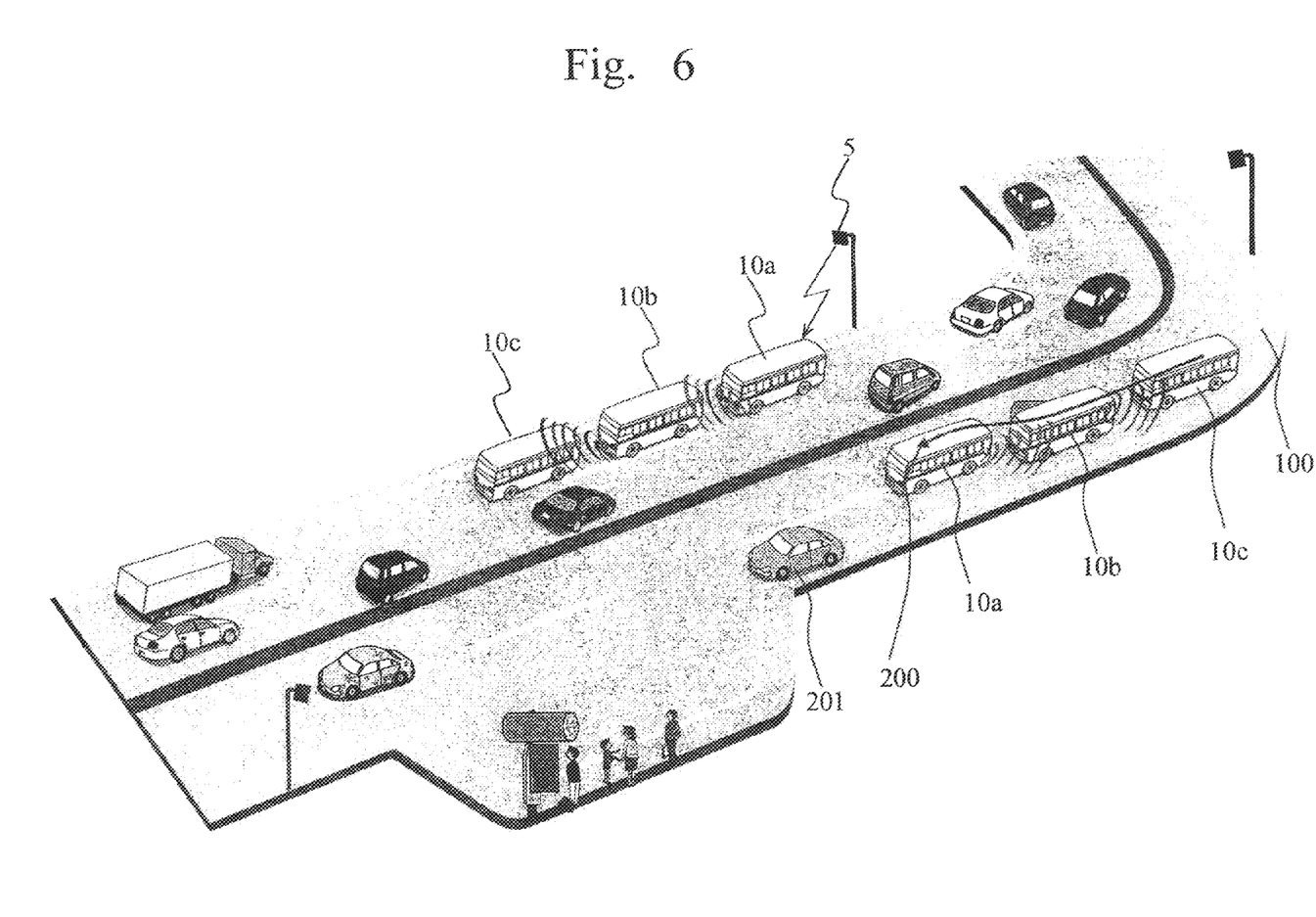
FIG. 6 is a drawing for explaining a lane change of vehicles of a train of vehicles according to the first embodiment.

FIG. 6 is an explanatory drawing of an example of changing lane of vehicles of a train of vehicles according to the first embodiment.

In the figure, the lead vehicle 10*a*, the following vehicle 10*b*, and the following vehicle 10*c* running on the road 100 perform a train-of-vehicle travel.

Here, when a parked vehicle 201 appears ahead of the lead vehicle 10*a*, the lead vehicle 10*a* detects the parked vehicle 201 by the sensor unit 1.

By this detection, the lead vehicle 10*a* automatically operates the steering so as to avoid the detected vehicle 201, and changes the lane to the neighboring lane.

At the same time, the following vehicle 10b receives the vehicle control data from the lead vehicle 10a by the inter-vehicle communication and changes the lane by following the lead vehicle 10a. Further, the following vehicle 10c receives the vehicle control data from the lead vehicle 10b by the inter-vehicle communication and changes the lane subsequently to the following vehicle 10b. By the above operation, as shown by an arrow 200 in FIG. 6, it is possible to change the lane smoothly with maintaining the train of vehicles.

As has been discussed above, the train-of-vehicle travel support device according to the first embodiment includes: the sensor unit 1 for mounting on the preceding vehicle (10a, 10b) obtaining the road line shape data including the three-dimensional position and data of the shape of the feature on the road surface; the processor unit 11 for mounting on the preceding vehicle obtaining running control data of the preceding vehicle based on comparison of the road line shape data showing the three-dimensional position and the shape of the feature obtained by the sensor unit 1 and reference data including the three dimensional position and the data of the shape of the road surface which has been previously stored; the inter-vehicle communication devices 3 and 4 transmitting the running control data of the preceding vehicle obtained by the processor unit 11 to the following vehicle; and the processor unit 12 for mounting on the following vehicle obtaining the running control data of the following vehicle 10c based on the running control data of the preceding vehicle transmitted by the inter-vehicle communication devices 3 and 4, and thereby the correct position of the vehicles running in the train of vehicles can be grasped without the magnetic marker.

Further, the processor unit 11 corrects the self-position measured by the navigation positioning based on the difference information of the road line shape data with respect to the reference data, and obtains the running control data of the self-vehicle based on the corrected self-position, and thereby the running control using the self-position data with a high precision can be done.

Further, the following vehicle is mounted with the sensor unit 2 which measures the position gap amount of the self-vehicle with respect to the preceding vehicle, and the processor unit 12 obtains the running control data of the self-vehicle based on the running control data of the preceding vehicle and the position gap amount measured by the sensor unit 2, and thereby the following vehicle can certainly carry out the follow-up running to the preceding vehicle.

REFERENCE SIGNS LIST

1: a sensor unit; 2: a sensor unit; 3, 4: inter-vehicle communication devices; 5: an on-road communication device; 7: an in-vehicle communication device; 10a: a lead vehicle; 10b, 10c: following vehicles; 11: a processor unit; 12: a processor unit; 52: a vehicle running correction data calculating unit; 53: a memory device; 61: a laser scanner; 62: a camera; 63: a GPS antenna; 64: a GPS receiver; 65: an odometry; 66: an inertial device; and 67: a processor unit.

The invention claimed is:

1. A train-of-vehicle travel support device comprising:
a sensor unit mounted on a vehicle and measuring a three-dimensional position and a shape of a feature on a road to produce a road line shape data;
a processor unit mounted on the vehicle and comparing the road line shape data to a reference data showing a three dimensional position and shape of the feature on the road surface which has been previously stored, computing a difference between the road line shape data and the reference data, and obtaining running control data of the vehicle based on the difference; and
an inter-vehicle communication device transmitting the running control data of the vehicle to a following vehicle which obtains running control data of the following vehicle based on the transmitted running control data of the vehicle.

2. The train-of-vehicle travel support device of claim 1, wherein the processor unit corrects a measurement error which is included in a self-position of the vehicle based on the difference, and obtains the running control data of the vehicle based on the corrected self-position.

3. The train-of-vehicle travel support device of claim 2, further comprising:
a following-vehicle-mounted sensor unit mounted on the following vehicle and measuring position gap amount of the following vehicle with respect to the vehicle,
wherein the following-vehicle-mounted processor unit obtains running control data of the following vehicle based on the running control data of the vehicle and the position gap amount.

4. The train-of-vehicle travel support device of claim 1, further comprising:
a following-vehicle-mounted sensor unit mounted on the following vehicle and measuring position gap amount of the following vehicle with respect to the vehicle,
wherein the following-vehicle-mounted processor unit obtains running control data of the following vehicle based on the running control data of the vehicle and the position gap amount.

5. A control system of a vehicle being mounted on the vehicle, the control system comprising:
a measurement unit for measuring a three-dimensional position and a shape of a feature on a road to produce a road line shape data;
a memory unit for previously storing a reference data showing a three-dimensional position and a shape of a feature on a road; and
a computing unit for computing a difference between the road line shape data and the reference data, and obtaining running control data of the vehicle based on the difference.

6. The control system of the vehicle of claim 5, wherein the computing unit corrects, based on the difference, a measurement error included in a self-position of the vehicle, and obtains the running control data of the vehicle based on the corrected self-position.

7. A processor unit mounted in a vehicle that follows a preceding vehicle and which obtains running control data of the vehicle based on running control data of the preceding vehicle received from a processor in the preceding vehicle that obtains the running control data of the preceding vehicle based on a difference between road line shape data indicating a three-dimensional position and a shape of a feature measured by the preceding vehicle and reference data showing a three-dimensional position and a shape of a feature which has been previously stored.

8. The processor unit of claim 7, wherein the processor in the preceding vehicle corrects, based on the difference, a measurement error included in a self-position of the preceding vehicle, and obtains the running control data of the preceding vehicle based on the corrected self-position.

* * * * *